United States Patent Office 3,373,144
Patented Mar. 12, 1968

3,373,144
PROCESS FOR THE PREPARATION OF ISOMERIZED UNSATURATED POLYESTERS
Harald Janssen, Witten-Heven, and Helmut Wulff, Witten-Annen, Germany, assignors to Chemische Werke Witten G.m.b.H., Witten (Ruhr), Germany
No Drawing. Filed May 13, 1964, Ser. No. 367,218
Claims priority, application Germany, May 18, 1963, C 29,973
14 Claims. (Cl. 260—75)

ABSTRACT OF THE DISCLOSURE

A method for isomerizing maleic acid and esterifiable derivatives thereof and preparing unsaturated polyester resins of fumaric acid comprising polycondensing maleic acid or esterifiable derivatives thereof with a polyhydric alcohol in the presence of an effective catalytic quantity of a cyclic secondary amine, to effect a cis-trans isomerization of the maleic acid or esterifiable derivative thereof to fumaric acid and to shorten the esterification time of the fumaric acid and polyhydric alcohol.

It is known to prepare unsaturated polyesters by esterifying $\alpha,\beta$-unsaturated dicarboxylic acids with polyhydric alcohols. In this process a plurality of different unsaturated dicarboxylic acids may be reacted with a large number of polyhydric alcohols, depending on the intended field of use. It is also possible to substitute, for a portion of the unsaturated dicarboxylic acids, saturated aliphatic or aromatic carboxylic acids in order to obtain certain specifically desired properties.

The unsaturated polyesters may be dissolved in monomeric vinyl, allyl, or acrylic compounds, and these moldable materials may be hardened to solid, insoluble and unmeltable three-dimensionally cross-linked molded articles in known manner by means of organic peroxides and, if desired, accelerators.

It is also known that unsaturated polyesters prepared from fumaric acid and symmetrical diprimary glycols as well as, if desired, suitable saturated dicarboxylic acids are crystalline solid masses which may be ground relatively easily to powdery, non-tacky substances. In this form, unsaturated polyesters are particularly suitable for making molding materials which are free flowing and can be granulated.

However, fumaric acid is more difficultly obtainable than maleic acid and may be produced from the latter by transposition. Moreover, the esterification of maleic acid, and particularly the anhydride thereof, is easier and technically simpler than is that of fumaric acid.

As a result, processes have been previously proposed in the art for transposing maleic acid into the fumaric acid configuration, i.e. to effect a cis-trans isomerization in the finished polyester or during the condensation thereof. Thus, the polyester was dissolved and isomerized with the aid of bromine and light, or the esterification of maleic acid was carried out in the presence of catalytic amounts of iodine. The foregoing process is technically complicated since the polyester must first be dissolved in a suitable solvent which must then be removed again after exposure to light. Also, the exposure to light is not easily effected in the case of large batches.

The use of catalytic amounts of iodine, according to the process described in DAS 1,113,087, requires uneconomically long condensation times until low acid numbers are attained at a temperature of 180° C.

It is well known that an isomerization of maleic acid to fumaric acid may also take place under the usual conditions of melting condensation. This isomerization, however, does not take place completely in all instances, as has been frequently stated in the literature. Rather, the extent of isomerization is influenced by the experimental conditions and, in a decisive manner, by the type of the alcohol component, and other polyester components, used. Particularly high degrees of isomerization (up to about 95%) will result from the use of diols with neighboring OH groups such as butanediol-(2,3), butanediol-(1,2), and propanediol-(1,2). 1,3-diols, such as butanediol-(1,3), for example, yield polyesters with means isomerization degrees, under comparable conditions of preparation, while polyesters prepared from diprimary diols have mean to low degrees of isomerization. An increasing chain length of the diol used results in a reduction of the degree of isomerization which tends, however, toward a limiting value. Accordingly, polyesters prepared from maleic anhydride and butanediol-1,4, or hexanediol-1,6, or decanediol-1,10, or diethylene glycol, have degrees of isomerization of only about 20 to 30 percent.

An increase in the degree of isomerization is significant for two reasons: First, the crystallization tendency increases in unsaturated polyesters prepared from diprimary diols with an increasing degree of isomerization. Thus, for example, a polyester prepared from maleic anhydride and hexanediol-1,6, for which a degree of isomerization of 18.5 percent was found polarographically, is a clear viscous liquid. An initial crystallization is observed at a degree of isomerization of about 30 percent and is considsubstances are formed at room temperature. With a degree of isomerization of about 40 percent, white paste-like substances are fromed at room temperature. With a degree of isomerization of about 60 percent, solid substances are formed which show considerable hardness and have softening points of about 100° C. when the degree of isomerization is increased to that of pure fumaric acid polyester. More highly isomerized polyesters prepared from diprimary diols may be ground to fine, non-tacky powders by virtue of their crystallinity, which is visible also in the X-ray spectrum, and are therefore of interest in combination with copolymerizable monomers, peroxidic catalysts and, if desired, fillers for molding materials which are free flowing.

Second, it can be proved that, with an increasing degree of isomerization, there is an increase in the cross-linking density of the molded articles prepared from linear unsaturated polyesters and styrene. This results in a considerable increase in the desired mechanical properties, such as solidity, bending strength and modulus of elasticity, whereas, for example, the capability of swelling in organic solvents is reduced.

It is apparent from the foregoing that fumaric acid polyesters have more desirable properties for some fields of application than do maleic acid polyesters the degree of isomerization of which is small under the conditions of use.

It has now been found that the transposition of maleic into fumaric acid during condensation of the polyesters is particularly successfully and favorably effected when cyclic secondary amines, preferably piperidine and the derivatives thereof, are added to the reaction mixture in catalytic amounts. It has been found that the extent of the transposition and, thus, the isomerization is dependent upon the kind and quantity of the catalyst used. Piperidine, 3-methyl piperidine or 4-methyl piperidine, when added in an amount of 0.5 percent by weight based upon the starting materials, effect an almost complete isomerization. When using the same amounts of other cyclic secondary amines, for example, 2,6-dimethyl piperidine, tetrahydroquinoline, or decahydroquinoline (see Table 1 below), correspondingly lower degrees of isomerization are obtained depending upon the constitution thereof. Accordingly, any desired degree of isomerization and, thus, specific properties in the unsaturated polyester as well as of the molded articles made therefrom may be obtained.

By means of polarographic analysis of the polyester hydrolyzates, small amounts of maleic acid also may be found in the aforementioned highly isomerized polyesters. A further increase in the degree of isomerization to 100 percent from the highest value attained (94%) is unnecessary. Neither the unsaturated polyesters nor the molded articles made from the latter display any differences in properties when compared with the corresponding polyesters of pure fumaric acid.

It further has been found that the esterification of the starting materials is considerably accelerated by the cyclic secondary amines to be used in accordance with the present invention. Thus, the esterification time may be shortened to ½ to ⅓ of the non-catalyzed esterification reaction under otherwise identical reaction conditions. Also in the case of polyesters which isomerize almost completely under the manufacturing conditions and wherein, consequently, the addition of an isomerization catalyst is rendered unnecessary, the aforementioned substances execute a strongly accelerating effect.

In the present invention, primarily maleic acid, or the anhydride thereof, is used as the $\alpha,\beta$-unsaturated dicarboxylic acid starting material. However, the other esterifiable derivatives thereof, such as the dimethyl or diethyl ester, are utilizable in the present invention. It is also possible to use maleic acid in admixture with chloromaleic acid, citraconic acid or itaconic acid.

In addition to the foregoing unsaturated dicarboxylic acids, also saturated mono- or polyvalent aliphatic or aromatic carboxylic acids, or the anhydrides thereof, or the lower esters thereof may be used in admixture with maleic acid, if desired, such as benzoic acid, succinic acid, adipic acid, sebacic acid, phthalic acid anhydride, isophthalic acid, terephthalic acid, tetrahydrophthalic acid, trimellitic acid, tricarballyl acid, and pyromellitic acid. Also, halogen-containing carboxylic acids, such as tetrachlorophthalic acid and hexachloroendomethylene tetrahydrophthalic acid may be utilized.

Suitable polyhydric alcohols are ethylene glycol, diethylene glycol, triethylene glycol, tetraethylene glycol, propanediol-1,2, propanediol-1,3, 2,2-dimethyl propanediol-1,3, butanediol-1,3, butanediol-1,4, pentanediol-1,5, hexanediol-1,6, glycerine, trimethylol propane and pentaerythritol. If more than bivalent esterification components are used, it is advisable to proportionately reduce monovalent compounds in order to decrease the likelihood of cross-linking.

The polycondensation may be effected in known manner, preferably in a melt at temperatures in the range of 150 to 210° C., or in the presence of an agent such as xylene.

The isomerized unsaturated polyesters prepared in accordance with the present invention may be dissolved in a number of known copolymerizable monomers, such as styrene, vinyl toluene, diallyl phthalate, triallyl cyanurate, acrylamide or butyl methacrylate, and polymerized in known manner. If solid monomers and dry polymerization catalysts are employed with crystalline powdered polyesters, free flowing molding materials may be prepared.

The invention will be further illustrated by reference to the following specific examples in which parts are parts by weight.

Example 1

98.0 parts of maleic anhydride, 130 parts of hexanediol-1,6 and 1.14 parts of piperidine are heated in a flask equipped with a stirrer, while an inert gas is passed therethrough and the resulting water is distilled off, initially for 24 hours to 100° C., then to 130° C. for three hours, and then to 180° C. until an acid number of about 23 to 20 has been attained; three hours are required therefor. While cooling, the clear melt solidifies to a white crystalline mass which may be easily ground to a non-tacky powder.

In a comparative experiment without the addition of piperidine but under otherwise identical reaction conditions, a condensation time three times as long is required at 180° C. in order to obtain the above acid number. A highly viscous liquid is thereby obtained which does not crystallize when cooling.

A polarographic analysis shows a degree of isomerization of 93.2 percent as compared to 26.6 percent in the comparative experiment.

In the examples compiled in the following table, the quantity and kind of the catalyst was varied while all the other reaction conditions of Example 1 remained constant. No changes are effected by shortening the preliminary condensation time.

TABLE I

| Example | Catalyst | Concentration of the catalyst (percent by weight based upon the starting substances) | Condensation time at 180° C. (hours) | Acid Number | Isomerization Degree (percent) |
|---|---|---|---|---|---|
| 1 (see above) | Piperidine | 0.50 | 3 | 21.2 | 93.2 |
| 2 | do | 0.04 | 10 | 27.8 | 77.6 |
| 3 | do | 0.01 | 9½ | 21.8 | 30.5 |
| 4 | 2-methyl piperidine | 0.5 | 5 | 19.7 | 70.0 |
| 5 | 3-methyl piperidine | 0.5 | 4¼ | 20.2 | 93.6 |
| 6 | 4-methyl piperidine | 0.5 | 3 | 23.1 | 94.0 |
| 7 | 2,6-dimethyl piperidine | 0.5 | 5 | 20.7 | 46.1 |
| 8 | Tetrahydroisoquinoline | 0.5 | 8 | 23.1 | 85.6 |
| 9 | Tetrahydroquinoline | 0.5 | 5½ | 20.4 | 31.9 |
| 10 | Decahydroquinoline | 0.5 | 6½ | 20.0 | 51.4 |
| 11 | Tetrahydroquinaldine | 0.5 | 8 | 20.5 | 32.2 |
| 12 | Control | | 9 | 21.6 | 26.6 |
| 13 | do | | 9¼ | 22.0 | 26.8 |

Example 14

A mixture of 98.0 parts of maleic anhydride, 99.0 parts of butanediol-1,4 and 1.14 parts of piperidine is heated, as described in Example 1, initially for six hours to 100° C., then to 130° C. for three hours, and then to 180° C. for five hours until an acid number of 21.3 has been reached. A clear, slightly brownish melt is obtained which quickly solidifies upon cooling to a hard, crystalline non-tacky mass.

A similar result is obtained by heating the components to 205° C. during a period of five hours to thereby effect the condensation to the same acid number given above.

Example 15

A mixture of 149 parts of maleic anhydride, 150 parts of butanediol-1,4, and 0.03 part of hydroquinone is reacted with 0.6 part of iodine. Another mixture having the same composition is reacted with 1.7 parts of piperidine instead of iodine.

Both batches are heated, as described in Example 1, and under the same reaction conditions, initially for three hours to 160° C. and then to 180° C. until an acid number of about 23 has been reached. For the batch catalyzed with piperidine, less than ⅓ of the condensation time required for the batch catalyzed with iodine is required (6 hours as compared to 20 hours at 180° C.).

It will be obvious to those skilled in the art that many modifications may be made within the scope of the present invention without departing from the spirit thereof, and the invention includes all such modifications.

As mentioned above, there may be used as monovalent compounds, in addition to the aforementioned mono carboxylic acids, also monovalent alcohols such as isopropanol, butanol, cyclohexanol, benzyl alcohol, ethyl glycol and butyl glycol. The preferred range of catalyst quantity is 0.01–1% by weight of cyclic secondary amines (related to the starting substances) though larger catalyst quantities, even if uneconomical, can also be used.

What is claimed is:

1. A process for the preparation of an isomerized unsaturated polyester resin which comprises polycondensing a compound selected from the group consisting of maleic acid and esterifiable derivatives thereof with a polyhydric alcohol in the presence of an effective catalytic quantity of a cyclic secondary amine, whereby isomerization of the maleic acid to fumaric acid is effected and the esterification reaction is accelerated.

2. A process according to claim 1 in which maleic anhydride is polycondensed with a polyhydric alcohol.

3. A process according to claim 1 in which the polyhydric alcohol is hexanediol-1,6.

4. A process according to claim 1 in which the polyhydric alcohol is butanediol-1,4.

5. A process according to claim 1 in which the cyclic secondary amine is piperidine.

6. A process according to claim 1 in which the cyclic secondary amine is a methyl piperidine.

7. A process according to claim 1 in which the cyclic secondary amine is a dimethyl piperidine.

8. A process according to claim 1 in which the cyclic secondary amine is tetrahydroisoquinoline.

9. A process according to claim 1 in which the cyclic secondary amine is tetrahydroquinoline.

10. A process according to claim 1 in which the cyclic secondary amine is decahydroquinoline.

11. A process according to claim 1 in which the cyclic secondary amine is tetrahydroquinaldine.

12. A process according to claim 1 in which the reaction mixture contains a saturated carboxylic acid.

13. A process according to claim 1 in which the reaction mixture contains a monohydric alcohol.

14. A process according to claim 1, wherein the polyhydric alcohol is selected from the group consisting of ethylene glycol, diethylene glycol, triethylene glycol, tetraethylene glycol, propanediol-1,2, propanediol-1,3, 2,2-dimethyl propanediol-1,3, butanediol-1,3, butanediol-1,4, pentanediol-1,5, hexanediol-1,6, glycerine, trimethylol propane and pentaerythritol; said cyclic secondary amine is selected from the group consisting of piperidine, methyl piperidine, dimethyl piperidine, tetrahydroisoquinoline, tetrahydroquinoline, decahydroquinoline and tetrahydroquinaldine; said effective catalytic quantity is about 0.5% by weight of said compound, said polyhydric alcohol, and said cyclic secondary amine; and said polycondensing is carried out at a temperature of about 150 to 210° C.

References Cited
UNITED STATES PATENTS

| | | | |
|---|---|---|---|
| 2,373,527 | 4/1945 | Agens | 260—75 |
| 2,646,416 | 7/1953 | Parker | 260—75 |
| 2,779,701 | 1/1957 | Robitschek et al. | 260—75 XR |
| 3,060,152 | 10/1962 | Ringwald | 260—75 |

WILLIAM H. SHORT, *Primary Examiner.*

LOUISE P. QUAST, *Examiner.*